United States Patent [19]
Wartenhorst

[11] Patent Number: 4,790,261
[45] Date of Patent: Dec. 13, 1988

[54] METHOD OF MECHANICAL MILKING

[75] Inventor: Bernhard S. Wartenhorst, Warendorf, Fed. Rep. of Germany

[73] Assignee: Westfalia Separator AG, Oelde, Fed. Rep. of Germany

[21] Appl. No.: 62,525

[22] Filed: Jun. 12, 1987

[30] Foreign Application Priority Data

Jun. 27, 1986 [DE] Fed. Rep. of Germany ....... 3621666

[51] Int. Cl.⁴ ................................................ A01J 5/00
[52] U.S. Cl. ................................................... 119/14.02
[58] Field of Search ............... 119/14.01, 14.02, 14.08

[56] References Cited

U.S. PATENT DOCUMENTS 4,011,838 3/1977 Nordegren et al. ............. 119/14.08
4,190,021 2/1980 Reisgies ....................... 119/14.08 X
4,508,058 4/1985 Jakobson et al. ................ 119/14.02

FOREIGN PATENT DOCUMENTS 134933 6/1959 U.S.S.R. ........................... 119/14.02

*Primary Examiner*—Robert P. Swiatek
*Attorney, Agent, or Firm*—Sprung Horn Kramer & Woods

[57] ABSTRACT

A method of mechanical milking consists of a main milking phase and of a preceding stimulation phase involving mechanical stimulation of the teats of the animal to be milked. To obtain optimal milking readiness individual-specific stimulation is proposed, taking the different stimulation needs of each individual animal into account.

8 Claims, 1 Drawing Sheet

STIMULATION PHASE AS A FUNCTION OF LACTATION STAGE

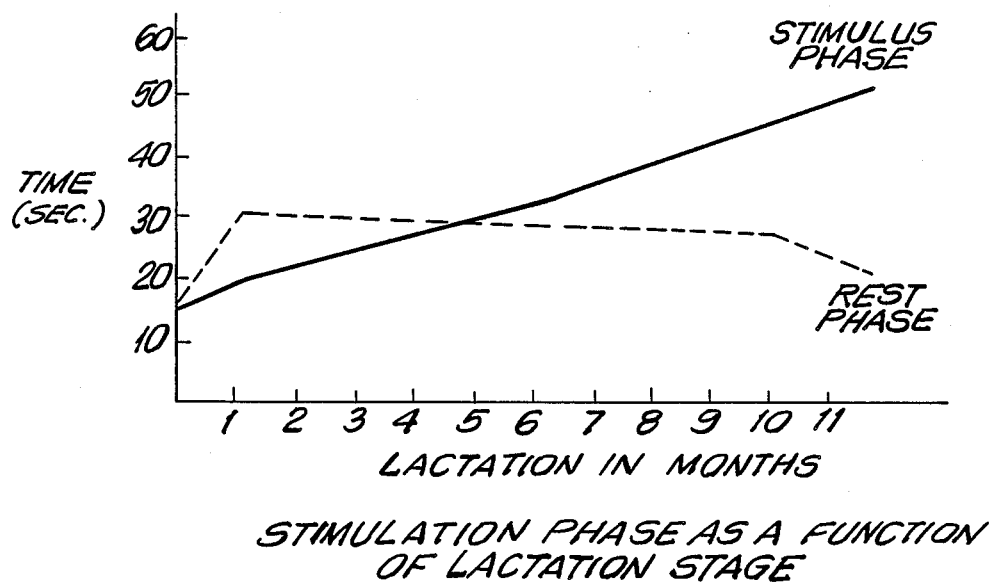
STIMULATION PHASE AS A FUNCTION OF LACTATION STAGE

METHOD OF MECHANICAL MILKING

BACKGROUND OF THE INVENTION

The present invention relates to a method of mechanical milking wherein pulsating milking cups that communicate with a vacuum line are applied to the teats of the animal being milked and the main milking phase is preceded by a stimulation phase that consists of a stimulus phase during which the teats are stimulated and of a rest phase.

A method of this type is known, from EP-B No. 0 032 752 for example, which, however, mentions only in very general terms that pulsation is unnecessary throughout the total stimulation phase. Furthermore, nothing is said therein about what the duration of pulsation depends on. Finally, the known methods operate with pulsators that have a fixed stimulation phase.

Daily practice demonstrates that different animals have different stimulation needs during lactation (the milking period). Too long a stimulation phase is just as much of a drawback as too short a stimulation phase. In the first case sensitive animals will be overstimulated and withdraw their milk. If the stimulation phase is too short on the other hand, the milk flow will not be intense enough and the milk yield unsatisfactory.

SUMMARY OF THE INVENTION

The object of the present invention is to provide a method of mechanical milking wherein optimum milking readiness can be obtained during the stimulation phase.

This object is attained in accordance with the invention by the improvement wherein the length of the stimulation phase and the temporal ratio of the stimulus phase to the rest phase are determined as a function of the animals' different stimulation requirements, resulting in stimulation that is specific for each individual animal.

The simplest way of individual-specific stimulation is to divide the herd into groups and to establish the needs for stimulation by observing the animals.

A valuable help in determining the need for stimulation is the particular lactation stage of each animal. Since animals at the same lactation stage have more or less the same need for stimulation, individual-specific stimulation can be established on that basis.

It is essential to prolong the stimulation phase as lactation proceeds. Brief stimulation is necessary to make the animal ready to milk at the beginning of lactation, meaning that stimulation should continue until the milk is released from the vicinity of the glands and flows into the vicinity of the cisternae of the udder. The result is obvious engorgement of the udder and teats. The longer the lactation takes, the longer and more intensely the animal must be stimulated to obtain the same result.

In addition to prolonging the stimulation phase it can also be practical to prolong the stimulus phase and abbreviate rest phase.

An especially practical form of the method is characterized in that the animal to be milked is identified by a device for automatically identifying animals that is connected to a processor, the animal's lactation stage is stored in the processor, and the processor initiates individual-specific stimulation. Operations that are capable of detecting the volume of milk produced are usually also capable of identifying the individual animal in order for example to assign individual-specific fodder concentrate on the basis of the yield of milk. When, then, the animal is identified at the milking station, the duration of stimulation can be called up in accordance with the lactation state and carried out by the pulsator.

Individual-specific stimulation can be improved even more if the time from the beginning of stimulation to the beginning of milk flow is determined and exploited to establish individual-specific stimulation. Milking off is accordingly permitted during the stimulus phase.

Optimum adjustment of the stimulation phase to the stimulation need of the animal can be obtained if individual-specific stimulation is established as a function of the lactation stage and of the beginning of the first milk flow.

The graph of the Figure illustrates how the duration of the stimulus phase and of the rest phase must vary as a function of the lactation stage to maintain the stimulation need of a cow.

The total duration of the stimulation phase is calculated by adding the read-out values of stimulus phase and of the rest phase. The stimulation need of a newly-lactating cow is about 50% lower than that of a cow that has been lactating for some time.

With some animals it may be necessary to stimulate the teats throughout the stimulation phase. In these cases the stimulus stage will last just as long as the stimulation stage, repressing the rest phase.

It will be appreciated that the instant specification and claims are set forth by way of illustration and not limitation, and that various modification and changes may be made without departing from the spirit and scope of the present invention.

What is claimed is:

1. In a method of mechanical milking wherein pulsating milking cups that communicate with a vacuum line are applied to the teats of the animal being milked and the main milking phase is preceded by a stimulation phase that consists of a stimulus phase during which the teats are stimulated and of a rest phase, the improvement wherein the length of the stimulation phase and the temporal ratio of the stimulus phase to the rest phase are determined as a function of the animals' different stimulation requirements, resulting in individual-specific stimulation that is specific for each individual animal, and wherein the particular lactation stage of each animal is the basis of individual-specific stimulation.

2. The method as in claim 1, wherein the animals to be milked are divided into groups in accordance with their individual stimulation needs and individual-specific stimulation is assigned to each group.

3. The method as in claim 1 or 2, wherein the time from the beginning of stimulation to the beginning of milk flow is determined and exploited to establish individual-specific stimulation.

4. The method as in claim 1, wherein the stimulation phase is prolonged as lactation proceeds.

5. The method as in claim 1, wherein the stimulus phase is prolonged and the rest phase abbreviated as lactation proceeds.

6. The method as in claim 1, wherein the animal to be milked is identified by a device for automatically identifying animals that is connected to a processor, the animal's lactation stage is stored in the processor, and the processor initiates individual-specific stimulation.

7. The method as in claim 1, wherein individual-specific stimulation is established as a function of the lactation stage and of the beginning of the first milk flow.

8. The method as in claim 1, wherein the end of the stimulus stage coincides with the end of the stimulation stage, repressing the rest phase.

* * * * *